(12) United States Patent
Gunji et al.

(10) Patent No.: US 8,828,584 B2
(45) Date of Patent: Sep. 9, 2014

(54) LITHIUM-ION RECHARGEABLE BATTERY MODULE, VEHICLE WITH THE BATTERY MODULE AND GENERATING SYSTEM WITH THE BATTERY MODULE

(75) Inventors: Akira Gunji, Mito (JP); Shin Takahashi, Mito (JP); Hiroshi Iwasawa, Hitachi (JP); Shin Yamauchi, Mito (JP); Takefumi Okumura, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 221 days.

(21) Appl. No.: 13/442,894

(22) Filed: Apr. 10, 2012

(65) Prior Publication Data
US 2012/0263999 A1    Oct. 18, 2012

(30) Foreign Application Priority Data

Apr. 12, 2011    (JP) ................. 2011-087850

(51) Int. Cl.
*H01M 6/42*        (2006.01)
*H01M 10/0525*     (2010.01)
*H01M 10/0569*     (2010.01)
*H01M 10/058*      (2010.01)

(52) U.S. Cl.
CPC ........ *H01M 10/0525* (2013.01); *Y02T 10/7011* (2013.01); *H01M 2220/10* (2013.01); *H01M 2220/20* (2013.01); *H01M 10/0569* (2013.01); *H01M 10/058* (2013.01); *Y02E 60/122* (2013.01)
USPC ....................................... 429/156

(58) Field of Classification Search
None
See application file for complete search history.

(56) References Cited

U.S. PATENT DOCUMENTS

| | | | | |
|---|---|---|---|---|
| 5,853,914 A | * | 12/1998 | Kawakami | 429/66 |
| 2003/0031923 A1 | * | 2/2003 | Aoshima et al. | 429/127 |
| 2004/0023115 A1 | * | 2/2004 | Kato et al. | 429/231.8 |
| 2006/0257746 A1 | * | 11/2006 | Inagaki et al. | 429/231.5 |
| 2009/0286155 A1 | * | 11/2009 | Takehara | 429/199 |

FOREIGN PATENT DOCUMENTS

| | | |
|---|---|---|
| JP | 2005-32701 | 2/2005 |
| JP | 2006-324112 | 11/2006 |
| JP | 2010-170942 | 8/2010 |

* cited by examiner

*Primary Examiner* — Patrick Ryan
*Assistant Examiner* — Jose Colucci Rios
(74) *Attorney, Agent, or Firm* — Antonelli, Terry, Stout & Kraus, LLP.

(57) ABSTRACT

A lithium-ion rechargeable battery module having a plurality of lithium-ion battery cells, arranged that battery cells located at an high temperature portion of the module are electrically connected in parallel with battery cells located at a low temperature portion of the module. The battery cells at the high temperature portion have a higher electric resistance at 20° C. and a better high-temperature storage characteristic at 50° C. than those of the battery cells located at the low temperature portion.

13 Claims, 8 Drawing Sheets

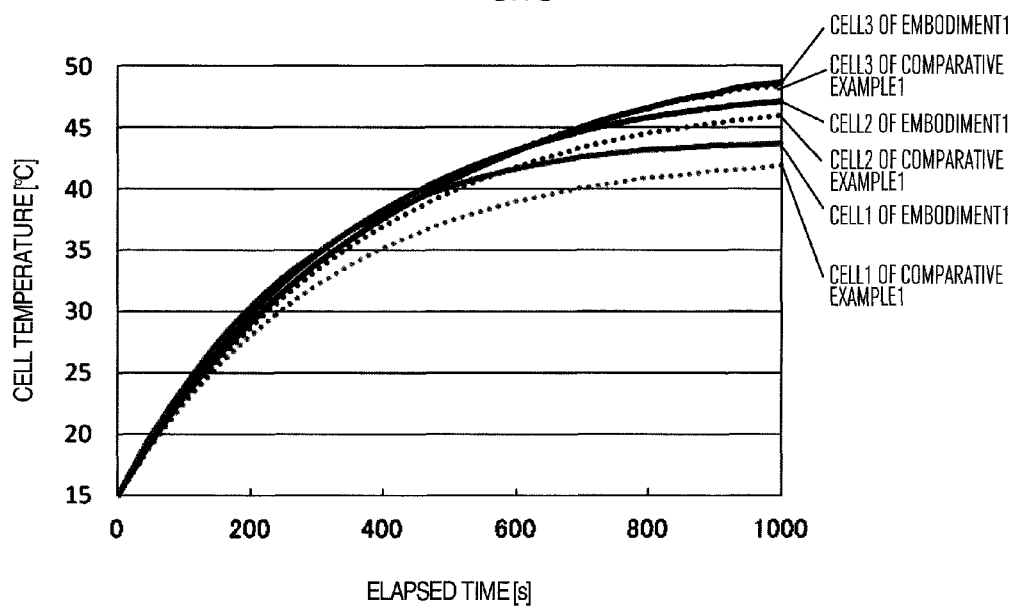
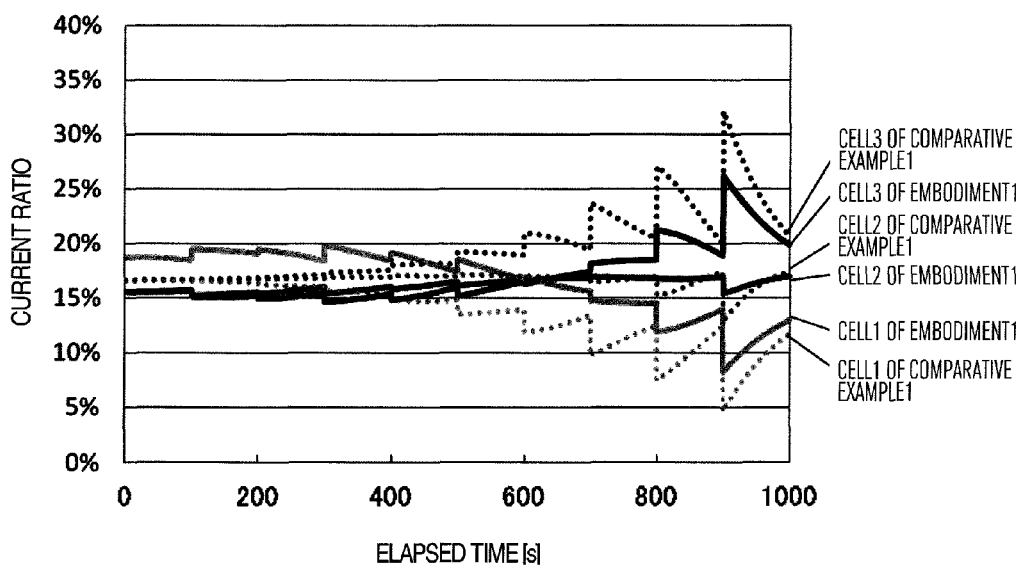

LITHIUM-ION RECHARGEABLE BATTERY MODULE, VEHICLE WITH THE BATTERY MODULE AND GENERATING SYSTEM WITH THE BATTERY MODULE

BACKGROUND OF THE INVENTION

The present invention relates to a lithium-ion battery module composed of a plurality of lithium-ion rechargeable battery cells, and to a vehicle and a generating system using such battery modules.

For the prevention of global warming and from concerns that fossil fuels may be exhausted in the near future, expectations have been growing in recent years for large-scale rechargeable battery modules, such as car-mounted rechargeable battery modules used on hybrid cars and electric cars running on a relatively small amount of energy and stationary rechargeable battery modules for smoothing the output of generating systems operating on renewable energies such as solar and wind power. These rechargeable battery modules are required to have both a high output density and a high energy density.

Because of its excellent properties in both the output density and energy density when compared with other battery modules using nickel-metal hydride rechargeable battery cells or lead storage battery cells, a battery module using lithium-ion rechargeable battery cells is expected to expand its car-mounted and stationary applications.

When operated at high output, a large battery module using a combination of a plurality of rechargeable battery cells rises in temperature. When the battery module is installed at locations where heat dissipation is not enough, its battery temperature does not fall as much as it would when installed at other locations, resulting in significant performance deteriorations in the form of capacity drop and resistance increase. To avoid this, a variety of measures are being studied that will enhance an efficiency of cooling the battery module and minimize performance degradations at high temperatures.

JP-A-2006-324112 discloses a battery module so constructed that each air flow path between adjacent flat battery cells is made narrower toward the downstream of cooling air to enhance the cooling efficiency.

JP-A-2005-32701 discloses a lithium-ion battery cell with 0.01%-10% of vinylene carbonate added for improvement of storage characteristics of battery cells at high temperatures. The storage characteristics of battery cells at high temperatures indicate the capability of keeping the battery capacity when the battery is preserved in high temperature condition.

JP-A-2010-170942 discloses a battery module in which the amount of electrolyte in each cell is increased as the cell installation position in the module moves from a low temperature portion to a higher temperature portion in order to reduce variations in performance deteriorations caused by high rate charging and discharging.

SUMMARY OF THE INVENTION

The battery module described in JP-A-2006-324112, although its cooling efficiency is enhanced, requires a flow path and a structure for heat dissipation to be installed between the battery cells, resulting in a reduced energy density per volume of the battery module.

While JP-A-2005-32701 describes additives for improving the storage characteristics at high temperatures, since the additives also increase a resistance, their amounts are necessarily limited. So, the improvement of the high-temperature storage characteristics of the battery cells is not enough.

Although the battery module described in JP-A-2010-170942 can reduce variations among the cells in performance degradation caused by high rate charging and discharging, it cannot prevent temperature rise at high temperature portions nor improve the storage characteristics at high temperatures. Therefore, performance degradations as a module cannot be prevented.

In light of the aforementioned problems, it is an object of this invention to provide a lithium-ion rechargeable battery module that can prevent a temperature increase at high temperature portions of the module and performance degradations at high temperatures without lowering an energy density per volume of the module by securing an enough heat dissipation space. It is also an object of this invention to provide a vehicle and a generating system using such lithium-ion rechargeable modules.

To achieve the above objective, the lithium-ion rechargeable battery module according to a first aspect of this invention is constructed of a plurality of electrically interconnected rechargeable lithium-ion battery cells such that one or more cells located at an high temperature portion of the module are electrically connected in parallel with battery cells located at a low temperature portion of the module and that the battery cells at the high temperature portion have a higher electric resistance at 20° C. and a better high-temperature storage characteristic at 50° C. (capacity retention rate following storage at 50° C.).

A vehicle according to a second aspect of this invention mounts the lithium-ion rechargeable battery module of the first aspect of the invention.

A generating system according to a third aspect of this invention uses the lithium-ion rechargeable battery module of the first aspect of the invention.

With this invention, a lithium-ion rechargeable battery module can be realized which can minimize a temperature rise at the high temperature portion of the module structure, which is designed to dissipate heat from among the battery cells, by limiting the amount of heat generated at the high temperature portions of the module. Further, the lithium-ion rechargeable battery module of this invention can also minimize its degradation caused by exposure to high temperatures even when the cell temperatures rise to some extent because the cells at the high temperature portions are given a good high-temperature storage characteristic. It is also possible to realize vehicles and energy storage systems using this rechargeable battery module. This in turn makes it possible to reduce flow paths and a structure for heat dissipation between the cells, resulting in an improved energy density per volume.

Other objects, features and advantages of the invention will become apparent from the following description of the embodiments of the invention taken in conjunction with the accompanying drawings.

BRIEF DESCRIPTION OF THE DRAWINGS

FIG. 3 shows temperature distributions in the embodiment 1 of this invention and the comparative example 1 for 8 W/m²/K.

FIG. 4 shows current ratios in the embodiment 1 of this invention and the comparative example 1 for 8 W/m²/K.

DESCRIPTION OF THE EMBODIMENTS

Figure 1:
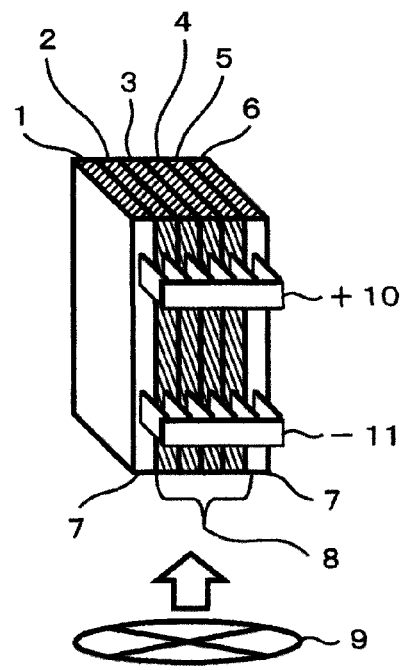
FIG. 1 is a schematic view of a battery module as an embodiment 1 of this invention.

Embodiments of the present invention will be described in the following.

Embodiments of the invention described below are given just as examples, to which this invention is not in any way limited.

The lithium-ion rechargeable battery cells in the battery module of this invention can have basically the same construction as the conventional one. For example, each of them may comprise a positive electrode, a negative electrode and a separator sandwiched between the positive and negative electrodes and impregnated with an organic electrolyte. The separator separates the positive and negative poles from each other to prevent a short-circuit and has pores through which lithium ions (Li$^+$) in the organic electrolyte pass.

The positive electrode is composed of a positive electrode active material related to the lithium ion intercalation and elimination reactions, a conductive material to impart a conductivity to the electrode, a binder for holding these materials together and a current collector such as metal foil. Various kinds of materials may be used as the positive electrode active material, which include for example: layered materials such as LiCoO$_2$, LiNiO$_2$, LiNi$_a$Co$_b$Mn$_{1-a-b}$O$_2$ and LiNi$_c$Co$_d$Al$_{1-c-d}$O$_2$; spinel-based materials such as LiMn$_2$O$_4$ and LiMn$_{1.5}$Ni$_{0.5}$O$_4$; olivine-based materials such as LiFePO$_4$ and LiFe$_e$MN$_f$Co$_{1-e-f}$PO$_4$; and solid solution materials such as xLi$_2$MnO$_3$-(1-x)LiNi$_g$Co$_h$Mn$_{1-g-h}$O$_2$. It is also possible to use a mixture of two or more kinds of positive electrode active materials. For the conductive material, carbon-based materials such as acetylene black and graphite are commonly used. PVdF (polyvinylidenfluoride) is generally used for binder.

The negative electrode is composed of a negative electrode active material related to the lithium ion intercalation and elimination reactions, a binder and a current collector such as metal foil. A conductive material that imparts a conductivity to the electrode may be added. As the negative electrode active material, various kinds of materials may be used, including: carbon based materials such as graphite and amorphous carbon; alloy materials such as Si alloys and Sn alloys; and oxide materials such as Li$_4$Ti$_5$O$_{12}$ and MoO$_2$. A mixture of two or more kinds of the negative electrode active materials may be used. For the binder, PVdF (polyvinylidenfluoride) is generally used.

The organic electrolyte is composed of Li salt, which is an electrolyte, and an organic solvent that dissolves the Li salt. For the Li salt, LiPF$_6$ and LiBF$_4$ are generally used. Carbon materials such as acetylene black and graphite are commonly used as the conductive material. Generally used as the organic solvent is a solvent mixture of cyclic carbonates, such as ethylene carbonate (EC) and propylene carbonate (PC), and open chain carbonates, such as dimethyl carbonate (DMC), ethyl methyl carbonate (EMC) and diethyl carbonate (DEC).

For the separator, a porous sheet of polypropylene (PP) or polyethylene (PE) is generally used.

The battery module of this invention has a plurality of lithium-ion rechargeable battery cells of the aforementioned basic construction, similar to the conventional one, combined therein such that these lithium-ion cells are electrically connected in parallel. Of the parallelly connected cells, those located at an high temperature position are given a higher resistance at 20° C. and a better high-temperature storage characteristic at 50° C. than those of the remaining cells located at other positions. This group of parallelly connected battery cells may be connected in series with other battery cell groups to form a single battery module. It is also possible to make an arrangement in which a plurality of battery cells at the high temperature position in the module are connected in series to form a series-connected cell group which is then parallelly connected with other cell groups located at other than the high temperature position, each made up of the same number of series-connected cells as the first group, In the above construction of this invention, the higher resistance in those battery cells located at an high temperature portion of the module makes it harder for electric current to flow therethrough, causing more current to flow through other cells connected in parallel with them. This reduces the amount of heat produced in the battery cells located at the high temperature portion and thereby minimizes a further temperature rise in the high temperature portion. Further, since the cells located at the high temperature portion has a good storage characteristics at high temperature, their performance degradation is minimal even when kept in a high-temperature state. With a temperature distribution in the module rendered relatively uniform, the module of this construction hardly deteriorates even at high temperatures. This enables a maximum allowable temperature of the module to be set higher, reducing the cooling requirement for the module. As a result, many advantageous effects are produced, such as an improved energy density per volume, a simplified operation control, a higher efficiency attributed to cooling energy reduction, and a reduction of cooling devices.

Methods for obtaining a battery cell with a high resistance and a good high-temperature storage characteristic for use on an high temperature portion will be explained as follows. The cause of deterioration at high temperatures, such as diminished capacity and resistance increase, is mainly the reaction between the electrolyte and the negative electrode. In preventing such degradations at high temperatures, it is therefore effective to form a firm protective film over the negative electrode and enhance the stability of the electrolyte.

To form a strong protective film, one method puts additives, such as vinylene carbonate (VC), in the electrolyte. It is noted that the amount of these additives has been limited to 5 wt % because they increase the battery cell resistance. However, since some resistance is required for those cells used on a high temperature portion in this invention, the use of additives at more than 5 wt %, or even 10 wt % or more, is allowed.

In one method of enhancing the stability of the electrolyte, the percentage of cyclic carbonates (e.g., EC and PC) more stable than open chain carbonates is increased. This method, however, causes a resistance increase due to an increased viscosity of the electrolyte and is therefore limited to 30-50 vol % for EC. For those cells used on high temperature portions that require some resistance in this invention, 50-70 vol % is permitted for EC. Further, since it increases the boiling point and flash point of the electrolyte, the increased EC density produces an additional effect of enhancing the battery cell safety.

These methods for obtaining battery cells used on high temperature portions have been described for example and other methods may also be used.

Embodiment

Embodiments that follow are presented as an example for the purpose of describing the present invention in detail and it is noted that the invention may be embodied in other specific forms without departing from the spirit thereof by making appropriate modifications.

Embodiment 1

Battery Module Construction of Embodiment 1

The construction of an embodiment 1 is shown in FIG. 1. Lithium-ion battery cells 1-6 were laminate sheet type cells each 6.5 mm thick. Six of these lithium-ion cells were stacked together and electrically connected in parallel to form a battery module. Of the six stacked cells, four at the center exposed to high temperatures (cells 2-5 in FIG. 1) were high resistance heat-tolerant battery cells 8 with higher VC and EC concentrations in the electrolyte than the two normal battery cells 7 installed at the ends of the module (cells 1, 6 in FIG. 1). The high resistance heat-tolerant battery cells 8 were found to be about 1.2 times higher in resistance at 20° C. and have a higher capacity retention rate when stored at 50° C. than the normal cells 7. The maximum allowable temperatures, with the battery cell longevity taken into account, were set at 50° C. for the high resistance heat-tolerant cells 8 and 45° C. for the normal cells 7. The module was cooled by a cooling fan 9 blowing air against it.

Comparative Example 1

Battery Module Construction of Comparative Example 1

Figure 2:
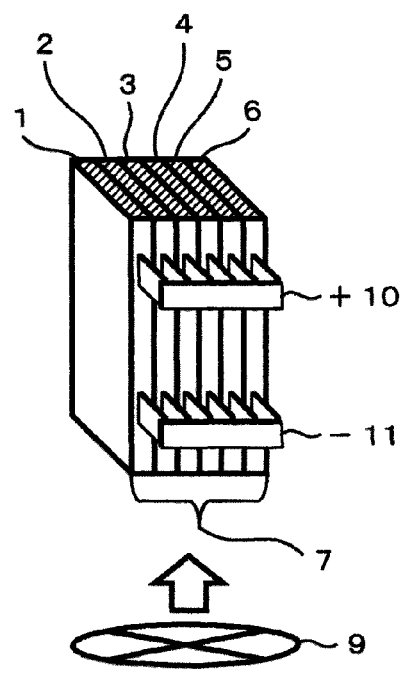
FIG. 2 is a schematic view of a battery module as a comparative example 1.

The construction of a comparative example 1 is shown in FIG. 2. As in the embodiment 1, lithium-ion battery cells 1-6 were laminate sheet type cells each 6.5 mm thick. Six of them were stacked together and electrically connected in parallel to form a battery module. All of the six lithium-ion battery cells were normal cells 7. The module was cooled by the cooling fan 9 blowing air against it, as in the embodiment 1.

(Detail of Test)

The battery modules of the embodiment 1 and the comparative example 1 were subjected to five charge/discharge cycles, in each of which the modules were discharged for 100 seconds at 5C (1C is a current value that discharges the modules from, or charges them to, the rated capacity in one hour) and then charged at 5C for 100 seconds. Then the air flow around the modules was changed to determine conditions where the heat transfer coefficient on the battery cell surface was 8 W/m²/K and 40 W/m²/K, respectively. Under these conditions, measurements were made of the temperature and current in the modules. The initial battery cell temperature and ambient temperature were set at 15° C. and the initial state of charge at 70%.

(Result of Test)

Because of their positional symmetry in the module, battery cell 1 and cell 6 are under almost the same condition. This also applies to cell 2 and cell 5 and to cell 3 and cell 4. In the following, the result will be shown only for the battery cells 1-3.

(Heat Transfer Coefficient of 8 W/m²/K)

FIG. 3 shows a temperature distribution of the cells and FIG. 4 a current ratio in these cells for the heat transfer coefficient of 8 W/m²/K. The current ratio represents the percentage of amount of current flowing in each cell to a whole current in the battery module. At the positions of cells 1, 2, comparison between the embodiment 1 and the comparative example 1 shows that the temperature is higher in the embodiment 1. This is attributed to the fact that the cells in the embodiment 1 have higher resistance as a whole than those of the comparative example 1 and thus produce a greater amount of heat. But for the position of cell 3, there is almost no difference between the embodiment 1 and the comparative example 1, showing that the maximum temperatures are kept at similar levels. The temperature distribution can therefore be said to be flattened. Since a cell with a higher temperature has a lower resistance, the current ratio in the comparative example 1 shows that a greater amount of electric current flows through the cell 3, which has a highest temperature, as a temperature difference among the cells increases. As for the embodiment 1, however, the cell 3 passes a restrained amount of current because it has a higher resistance than that of the counterpart in the comparative example 1. As a result, the temperature of the cell 3, which is highest among the three cells, is restrained as shown in FIG. 3, flattening the temperature distribution. This in turn produces a synergistic effect of leveling the current ratio, too. Further, the ability to limit an excess current offers an advantage of being able to minimize degradations caused by high current flow.

The cell temperatures that the individual cells reached after undergoing five cycles (1000 s) and their maximum allowable temperatures are shown in Table 1. In the comparative example 1, the cell 2 and cell 3 exceeded their allowable temperatures, whereas all the cells in the embodiment 1 remained below their allowable temperatures. In the embodiment 1 the cell temperatures were able to be controlled within their allowable levels even under the relatively weak cooling condition of 8 W/m²/K.

TABLE 1

Cell temperatures (° C.) and their allowable temperatures after 5 cycles (1000 s) under the cooling condition of 8 W/m²/K

| | Embodiment 1 | | Comparative example 1 | |
|---|---|---|---|---|
| | Temperature | Allowable temperature | Temperature | Allowable temperature |
| Cell 1 | 43.8 | 45 | 41.9 | 45 |
| Cell 2 | 47.2 | 50 | 46.1 | 45 |
| Cell 3 | 48.7 | 50 | 48.4 | 45 |

(Heat Transfer Coefficient of 40 W/m²/K)

Figure 5:
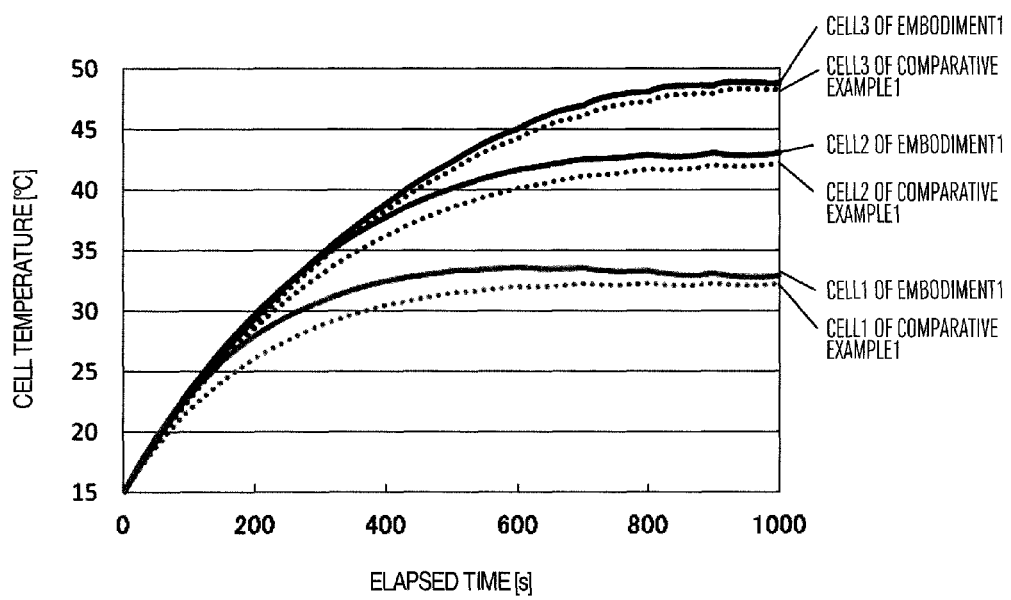
FIG. 5 shows temperature distributions in the embodiment 1 of this invention and the comparative example 1 for 40 W/m²/K.
Figure 6:
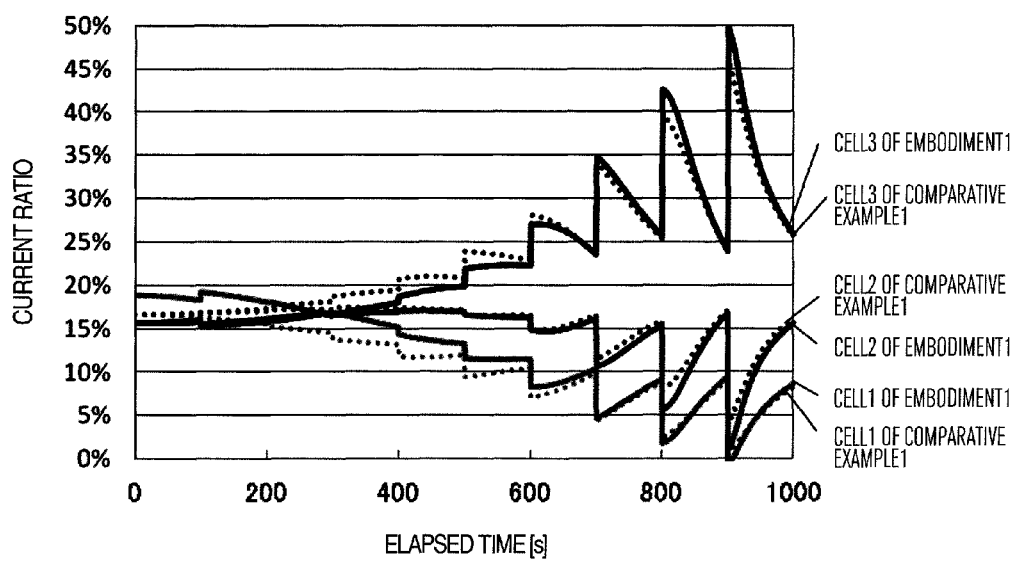
FIG. 6 shows current ratios in the embodiment 1 of this invention and the comparative example 1 for 40 W/m$^2$/K.

FIG. 5 shows a temperature distribution of the cells and FIG. 6 a current ratio in these cells for the heat transfer coefficient of 40 W/m²/K. It is seen from FIG. 5 that in both the embodiment 1 and the comparative example 1, the stronger cooling condition resulted in the temperatures of only the cell 1 and cell 2 going down, with the temperature of the cell 3, which was highest among the three cells, remaining almost unchanged. This caused the temperature distribution to widen, leading to a wider current ratio as shown in FIG. 6. The cell temperatures that the individual cells reached after undergoing five cycles (1000 s) and their maximum allowable temperatures are shown in Table 2. As shown in Table 2, even under the enhanced cooling condition, the cell 3 in the comparative example 1 could not be cooled efficiently below the allowable temperature.

It is shown from the above test result that the embodiment 1 has a narrower or more flat temperature distribution and a longer life at high temperatures than the comparative example 1, allowing the cooling requirement to be alleviated and the operation control to be performed with ease. This in turn enables the battery module to have a high volumetric energy density and a low cost.

TABLE 2

Cell temperatures (° C.) and their allowable temperatures after 5 cycles (1000 s) under the cooling condition of 40 W/m²/K

|  | Embodiment 1 | | Comparative example 1 | |
| --- | --- | --- | --- | --- |
|  | Temperature | Allowable temperature | Temperature | Allowable temperature |
| Cell 1 | 33.0 | 45 | 32.3 | 45 |
| Cell 2 | 43.0 | 50 | 42.3 | 45 |
| Cell 3 | 48.8 | 50 | 48.3 | 45 |

Embodiment 2

Battery Module Construction of Embodiment 2

Figure 7:
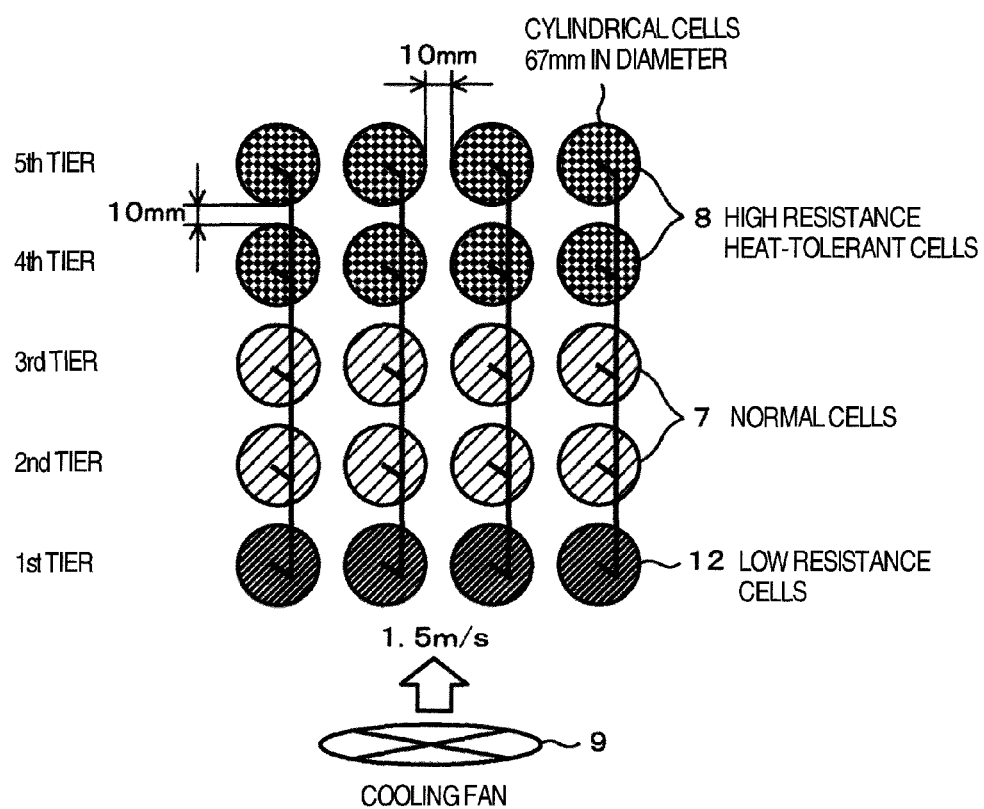
FIG. 7 is a schematic view of a system to drive an electric car using the battery module of the embodiment of this invention.

The construction of a second embodiment is shown in FIG. 7. A cylindrical cell 67 mm in diameter was used for the lithium-ion cell. The cylindrical cells were arrayed in five layers stacked one upon the other vertically, with the vertically arranged cells electrically connected in parallel and the horizontally arranged cells connected in series. These cells were spaced 10 mm from one another vertically and horizontally. They were cooled by the cooling fan 9 blowing air against them at 1.5 m/s.

Of the vertically arranged cells, those in upper two tiers (fourth and fifth tier in FIG. 7) that are heated to high temperatures employed high resistance heat-tolerant cells 8 having higher VC and EC concentrations in the electrolyte than those of normal cells 7 located at a central portion (second and third tier in FIG. 7). The high resistance heat-tolerant cells 8 was found to be about 1.5 times higher in resistance at 20° C. and have a higher capacity retention rate when stored at 50° C. than the normal cells 7. For the cells in a first tier in FIG. 7 that were kept at low temperatures at all times by the cooling fan 9, low resistance cells 12 were used which have a lower concentration in the electrolyte of cyclic carbonates, such as EC, and a higher concentration of open chain carbonate, such as EMC and DEC. The low resistance cells 12 were found to be about 5% lower in resistance at 20° C. and have a slightly lower capacity retention rate when stored at 50° C. than the normal cells 7. The maximum allowable temperatures on the outer surface of the cells, with the battery cell longevity taken into account, were set at 45° C. for the high resistance heat-tolerant cells 8, 40° C. for the normal cells 7 and 37° C. for the low resistance cells 12.

Comparative Example 2

Battery Module Construction of Comparative Example 2

Figure 8:
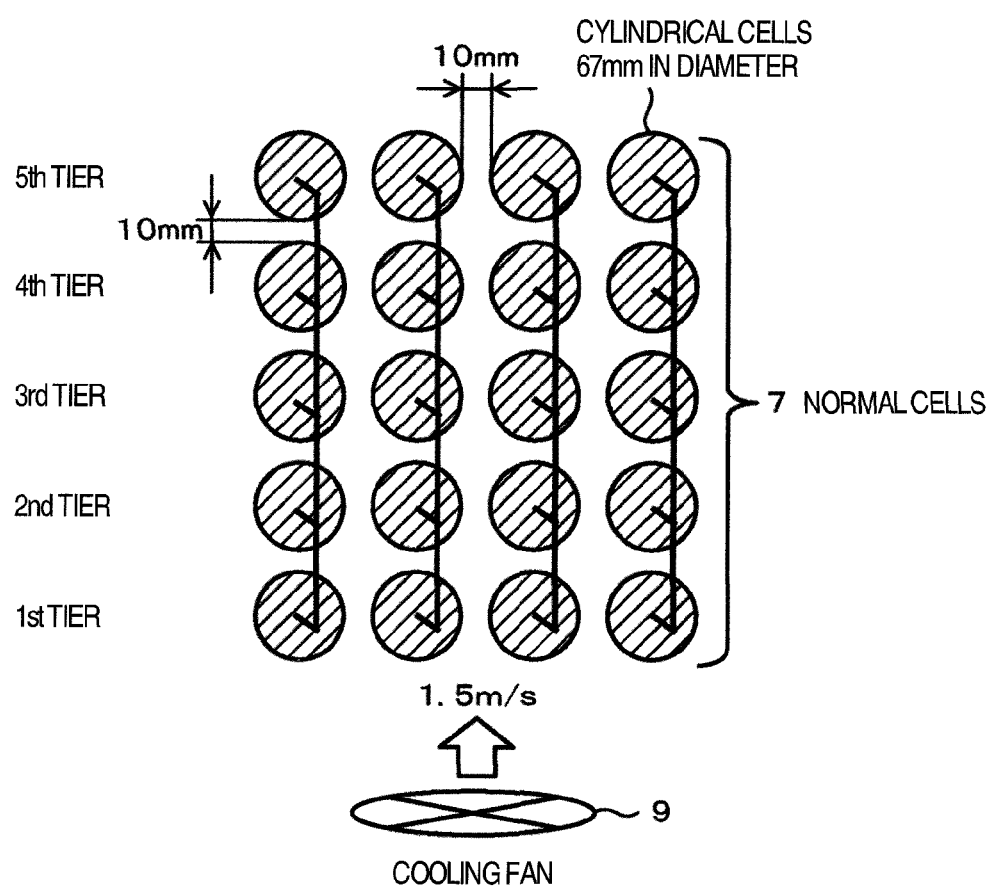
FIG. 8 is a schematic view of an electric energy storage system using the battery module of the embodiment of this invention.

The construction of a comparative example 2 is shown in FIG. 8. The comparative example 2 has the same construction as the embodiment 2, except that the normal cells 7 are used for all battery cells.

(Detail of Test)

The battery modules of the embodiment 2 and the comparative example 2 were subjected to 30 charge/discharge cycles, in each of which the modules were discharged for 60 seconds at 4C (1C is a current value that discharges the modules from, or charges them to, the rated capacity in one hour), followed by 300 seconds of rest, and then were charged at 4C for 60 seconds, followed by 300 seconds of rest. The initial battery cell temperature and ambient temperature were set at 20° C. and the initial state of charge at 60%.

Figure 9:
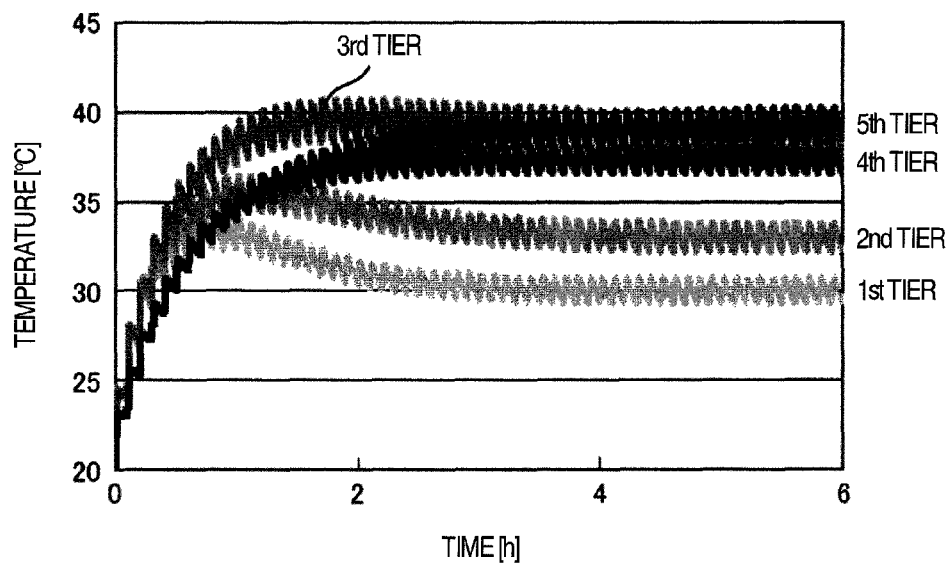
FIG. 9 is a graph showing outer surface temperature changes of battery cells in each tier near a horizontally central area in embodiment 2 of this invention.
Figure 10:
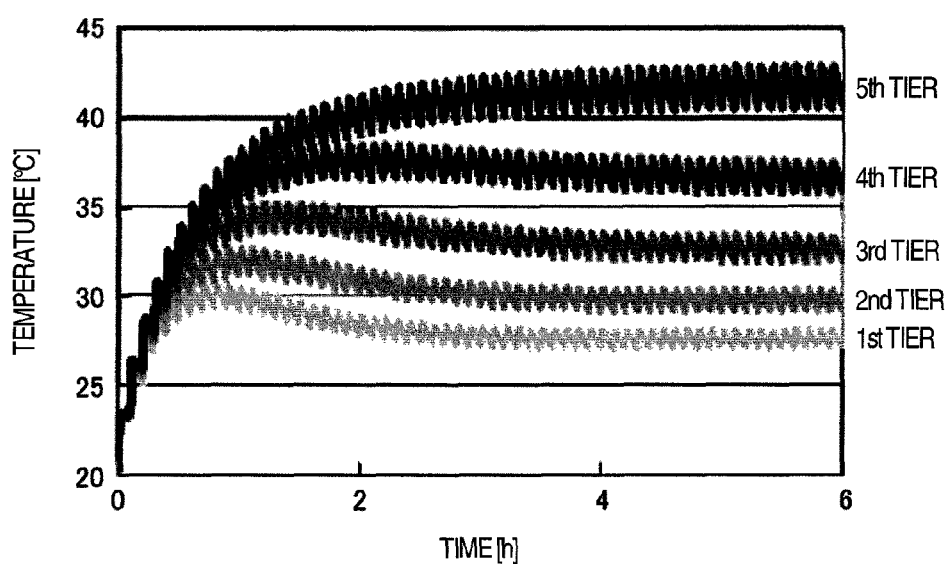
FIG. 10 is a graph showing outer surface temperature changes of battery cells in each tier near a horizontally central area in comparative example 2.

FIG. 9 shows outer surface temperature changes of the cells in each tier near a horizontally central portion of the module in the embodiment 2. FIG. 10 shows outer surface temperature changes of the cells in each tier near the horizontally central portion of the module in the comparative example 2. In the comparative example 2, about two hours from the start of the test, the cell temperature at the fifth tier began to exceed the maximum allowable temperature for the normal cells 7 of 40° C. continuously steadily. In the embodiment 2, on the other hand, no cells stayed above the 40° C. steadily for an extended period although the third tier cells did only temporarily. After six hours (30 cycles), it is possible that the fifth tier cells, whose temperature was slightly increasing over time, may rise above the 40° C. if they continue undergoing additional cycles. But the amount by which the fifth tier cells may exceed the 40° C. will fall within an allowable range because they are the high resistance heat-tolerant cells 8. As to the event in which the third tier cells temporarily exceeded the 40° C. at an initial stage of the test, this can be avoided by performing a control, such as suppressing the current rate until the temperatures of the fourth and fifth tier cells reach their elevated, steady level.

Figure 11:
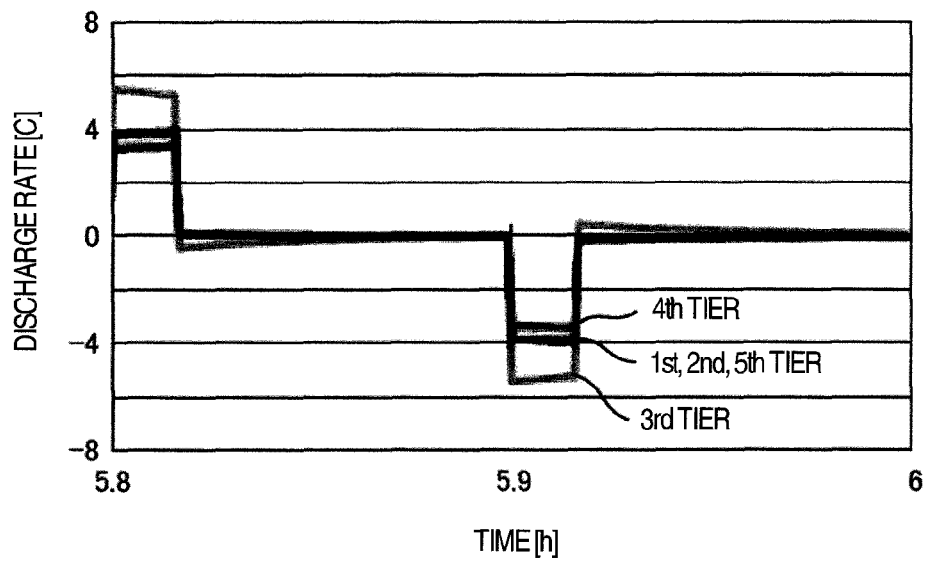
FIG. 11 shows discharge rate distributions at a 30th cycle in the embodiment 2 of this invention.
Figure 12:
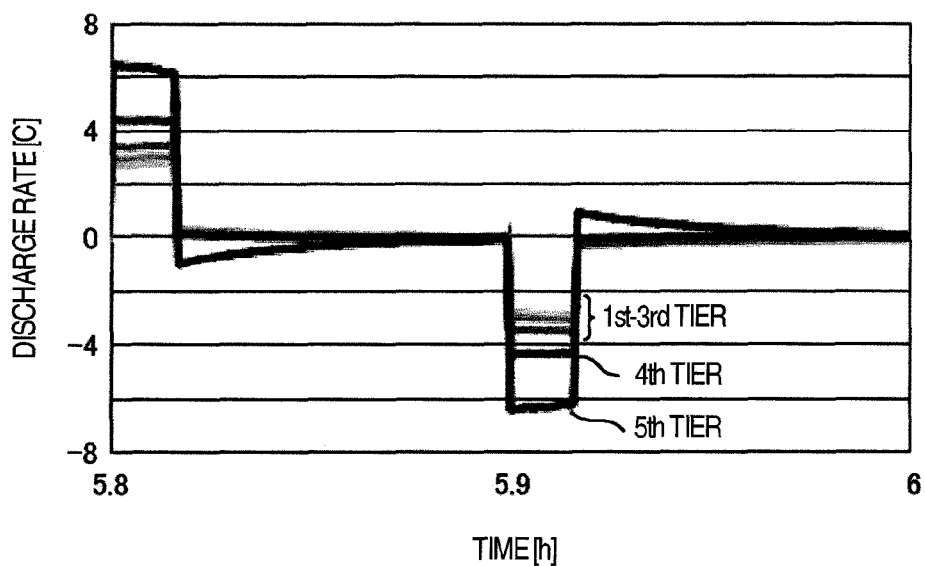
FIG. 12 shows discharge rate distributions at a 30th cycle in the comparative example 2.

FIG. 11 shows a discharge rate distribution in the 30th cycle in the embodiment 2. FIG. 12 shows a discharge rate distribution in the 30th cycle in the comparative example 2. Negative portions in FIG. 11 and FIG. 12 represent the periods when the cells were charged. For cells of the same specification, their resistance decreases as their temperature increases. This explains why in the comparative example 2 a greater amount of current flowed into the fifth tier cells, that were higher in temperature, than the cells of other tiers, with about 6C of current supplied to the fifth tier cells when the average charge/discharge current was 4C. This will result in an early degradation of the fifth tier cells due to the high rate charging/discharging compared with other tiers. In the embodiment 2, on the other hand, since the fifth tier cells heated to the highest temperature have higher resistance than the normal cells, the current concentration in these cells can be restrained. Even the third tier cells that underwent the highest charge/discharge rate received about 5C, verifying that the embodiment 2 can minimize the high-rate induced degradations when compared with the comparative example 2.

Embodiment 3

The lithium-ion rechargeable battery module shown in the embodiment 1 and the embodiment 2 can be used as a power supply for a variety of vehicles, such as hybrid trains that travel on both engine and motor, electric cars using batteries as an energy source for motor; hybrid cars, plug-in hybrid cars whose batteries can be charged by external sources, and fuel cell cars that derive electric energy from the chemical reaction between hydrogen and oxygen.

Figure 13:
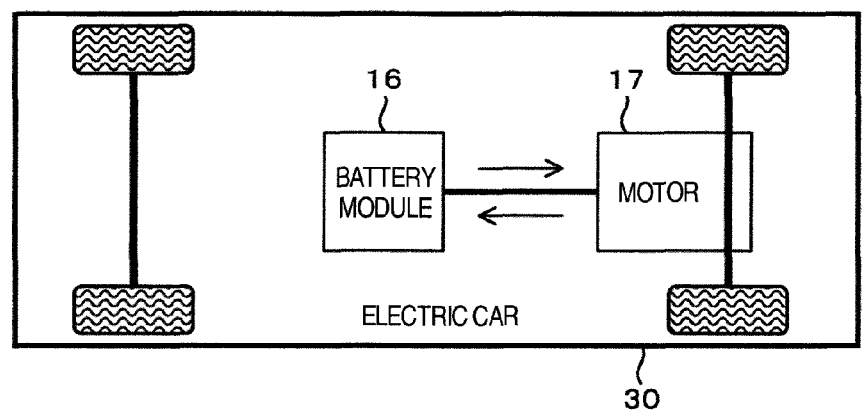
FIG. 13 is a schematic plan view of the electric car drive system.

A schematic plan view of a typical drive system for an electric car (vehicle) 30 is shown in FIG. 13.

An electric energy is supplied from a battery module 16 through a battery controller and a motor controller, both not shown, to a motor 17 to drive the electric car 30. During deceleration, an electric energy regenerated by the motor 17 is stored in the battery module 16 through the battery controller.

The application of the battery module 16 of this invention to an electric car (vehicle) 30 as in the embodiment 3 enhances the energy density, output, battery longevity and safety, which in turn improves the reliability of the vehicle. It can also reduce the cost of a battery module cooling device and its controller and therefore an overall cost of the vehicle 30.

The battery module of this invention is also applicable to a wide range of vehicles that use batteries, including forklift trucks, trucks used only in factory premises, motor-driven wheelchairs, satellites, rockets and submarines.

Embodiment 4

Figure 14:
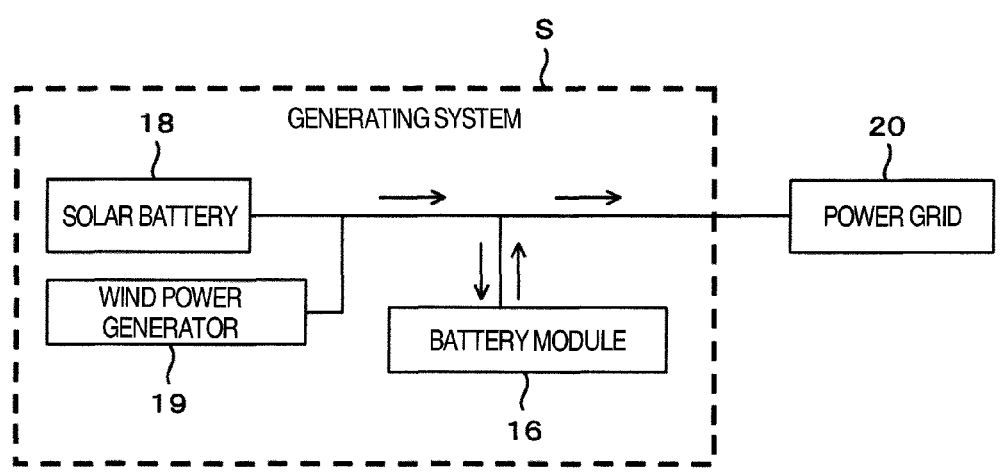
FIG. 14 is a schematic view of an energy storage type power supply in a generating system using renewable energies.

The lithium-ion rechargeable battery module shown in the embodiment 1 and embodiment 2 can be applied to an energy storage type power supply in a generating system S using renewable energies from a solar battery 18 that converts solar energy into electricity and from a wind power generator 19. The outline of the generating system is shown in FIG. 14.

In a power generation using renewable energies as from the solar battery 18 and wind power generator 19, the amount of electric power generated is unstable. For stable supply of electricity, electrical energy needs to be charged to or discharged from the energy storage type power supply according to load on a power grid 20.

The application of the battery module 16 of this invention to the energy storage type power supply improves the energy density, output, battery longevity and safety, resulting in improved reliability of the generating system (energy storage system) S. It can also reduce the cost of a battery module cooling device and its controller and therefore an overall cost of the system.

Although a generating system using the solar battery 19 and the wind power generator 19 has been shown as an example of the energy storage system, the battery module can also be applied to a wide range of other generating systems.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A lithium-ion rechargeable battery module having a plurality of lithium-ion battery cells arranged such that one or more battery cells located at high temperature positions of the module are connected in parallel with one or more battery cells located at other positions;
    wherein the battery cells located at the high temperature positions have a high internal resistance at 20° C. and a higher capacity retention rate following four weeks of storage at 50° C., as compared with those of the battery cells that are located at the other positions and connected in parallel with the high temperature position battery cells.

2. The lithium-ion rechargeable battery module according to claim 1, wherein the battery cells located at the high temperature positions of the module have an internal resistance at 20° C. more than 10% higher than that of the battery cells that are located at the other positions and connected in parallel with the high temperature position battery cells.

3. The lithium-ion rechargeable battery module according to claim 1, wherein the battery cells located at the high temperature positions of the module have a capacity drop rate (=1—capacity retention rate) following four weeks of storage at 50° C. which is more than 10% smaller than that of the battery cells that are located at the other positions and connected in parallel with the high temperature position battery cells.

4. The lithium-ion rechargeable battery module according to claim 1, wherein the battery cells located at the high temperature positions of the module have a higher vinylene carbonate concentration in an electrolyte than that of the battery cells that are located at the other positions and connected in parallel with the high temperature position battery cells.

5. The lithium-ion rechargeable battery module according to claim 4, wherein the battery cells located at the high temperature positions of the module have a vinylene carbonate concentration in the electrolyte of 10% or greater by weight.

6. The lithium-ion rechargeable battery module according to claim 1, wherein the battery cells located at the high temperature positions of the module have a higher ethylene carbonate concentration in an electrolyte than that of the battery cells that are located at the other positions and connected in parallel with the high temperature position battery cells.

7. The lithium-ion rechargeable battery module according to claim 6, wherein the battery cells located at the high temperature positions of the module have an ethylene carbonate concentration in the electrolyte of between 50% and 70% by volume.

8. The lithium-ion rechargeable battery module according to claim 1, wherein the internal resistance of the battery cells increases as their position in the module changes from a low-temperature portion to a high-temperature portion.

9. The lithium-ion rechargeable battery module according to claim 1, wherein a vinylene carbonate concentration of the battery cells increases as their position in the module changes from a low-temperature portion to a high-temperature portion.

10. The lithium-ion rechargeable battery module according to claim 1, wherein an ethylene carbonate concentration of the battery cells increases as their position in the module changes from a low-temperature portion to a high-temperature portion.

11. A vehicle mounting the lithium-ion rechargeable battery module claimed in claim 1.

12. A generating system using the lithium-ion rechargeable battery module claimed in claim 1.

13. A lithium-ion rechargeable battery module comprising:
    a plurality of lithium-ion battery cells connected in parallel, one or more of the battery cells being located at higher temperature positions of the battery module, and one or more of the battery cells being located at lower temperature positions of the battery module,
    wherein an internal resistance at 20° C. of the one or more of the battery cells located at the higher temperature positions of the battery module is higher than an internal resistance at 20° C. of the one or more of the battery cells located at the lower temperature positions of the battery module, and a capacity retention rate following four weeks of storage at 50° C. of the one or more of the battery cells located at the higher temperature positions of the battery module is higher than a capacity retention rate following four weeks of storage at 50° C. of the one or more of the battery cells located at the lower temperature positions of the battery module.

* * * * *